May 19, 1953  H. F. MATARÉ  2,639,388
WIDE BAND WAVEMETER
Filed Nov. 23, 1949

Inventor
Herbert François Mataré
By Robert E. Burns
Attorney

Patented May 19, 1953

2,639,388

UNITED STATES PATENT OFFICE 2,639,388

WIDE-BAND WAVEMETER

Herbert François Mataré, Vaucresson, France, assignor to Societe Anonyme dite: Compagnie des Freins & Signaux Westinghouse, Paris, France Application November 23, 1949, Serial No. 129,025
In France December 4, 1948

4 Claims. (Cl. 250—39)

Wavemeters of the resonant cavity type and provided with circular vernier adjustment means as currently used, generally possess a narrow frequency-band characteristic. The reason for this is that they are so designed that the amplitude of the variable-capacity adjustment cannot be very great, since the maximum value of said capacity does not exceed a value in the order of a few microfarads in the range of ultra-high frequencies. In other words, the amplitude of capacity adjustment in such wavemeters is restricted by mechanical limitations.

This invention has for its object to provide a wavemeter which is free of this drawback, and in which the variable capacity may be adjusted over a wide range so that the wavemeter is adapted for use over a comparatively wide frequency range.

The wavemeter of the invention is characterized by the following features considered singly or in combination:

(1) The variable capacity is formed by a fixed and a rotatable electrode. Both electrodes are formed with offsets, steps or shoulders in an axial direction and oppositely related each other, and the rotary electrode is arranged at the end of a control spindle provided with a control knob at its other end;

(2) On the rod of the rotary electrode a sleeve is mounted with a soft sliding fit, adapted to be moved within a resonant cavity axially thereof, said sleeve being in movable threaded engagement with a tapped hole formed in the frame of the apparatus and being rigid with an actuating bush;

(3) The fixed electrode of the capacity is connected with a plug socket for connection with the output of the apparatus supplying the frequency to be measured, while a detector located within the resonant cavity is magnetically coupled with the internal field, said detector having its output connected with one, interchangeable electrode of a capacitor the other electrode of which is earthed.

Further characteristic features and advantages of the invention will appear from the ensuing description and the accompanying diagrammatic drawings which illustrate by way of example only, one form of embodiment of the invention, and in which.

Figure 1:
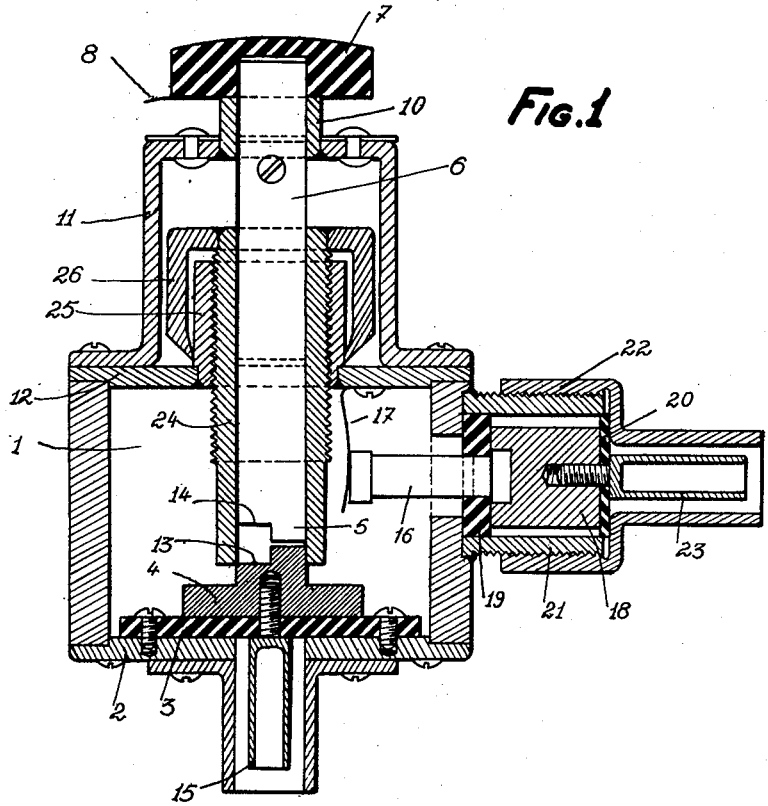
Fig. 1 is a sectional view of a wavemeter according to the invention.
Figure 2:
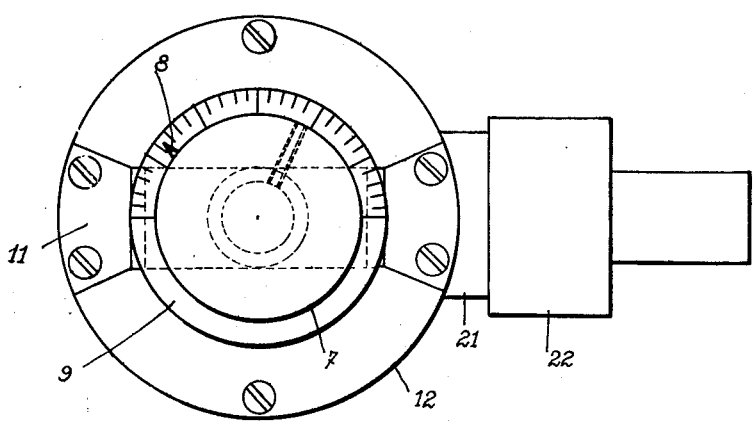
Fig. 2 is an overhead plan view thereof.

As shown in the drawings, the wavemeter comprises a resonant cavity 1 having a bottom plate 2 on which is secured through the interposal of an insulating washer 3 (made of trolitul or equivalent composition) and electrode 4 cooperating with a further and movable electrode 5 disposed at the end of a rotary control shaft or spindle 6 to form a capacity. The control spindle 6 is provided at its top end with an actuating button or knob 7 carrying a pointer 8 movable in front of a circular calibrated scale 9. The top of the spindle 6 is mounted in tubular part 10 rigid with a yoke member 11 to which the scale 9 is secured and which itself is secured to the top plate 12 of the reasonant cavity.

Each of the electrodes 4 and 5 is formed as shown in Fig. 1 with complementary oppositely-formed axial offsets, steps or shoulders 13 and 15 respectively, whereby the capacity may be varied within a predetermined range by circular movement.

The fixed electrode 4 is connected with a plug socket 15 for connection with the output of an apparatus the output frequency of which is to be measured.

Within the resonant cavity 1 is arranged a detector 16 magnetically coupled with the internal field and abutted at one end thereof against a spring 17 secured for instance on the top plate 12 of the resonant cavity. The output of detector 15 is connected with one electrode 18 of a capacity mounted between two insulating washers 19 and 20 (made of trolitul or the like) within a bushing 21 which constitutes the other electrode of said capacity, said electrode being connected to earth through a part 22 threaded over the bushing 21 and forming part of a connecting socket the other part of which is shown at 23. The socket 22—23 enables the wavemeter to be wired into a suitable circuit.

The electrode 18 is removable to allow replacement by another electrode of different diameter in order to alter its capacity.

Over the spindle 6 of the rotary armature 5 an externally threaded sleeve 24 is mounted a soft sliding fit, and the sleeve 24 is screwed into a complementarily tapped bushing 25 rigid with the top plate 12 of the resonant cavity 1. The sleeve 24 is rigid with an actuating bushing 26 having a bevelled lower edge which may carry an index marker movable in front of a calibration carried by the bushing 25.

To modify the initial capacity, the button 7 is rotated thereby rotating the spindle 6 and the movable electrode 5, as a result of which the capacity is varied from a minimum value (corresponding with the position shown in Fig. 1)

to a maximum value corresponding with a 180° rotation of the movable electrode 5. The wide range of possible adjustment of the wavemeter of the invention is secured by actuation of the bushing 26 which moves the sleeve 24 up and down, thereby adapting the effective volume of the resonant cavity to the limiting conditions of the operating range of the apparatus.

The scale 9 may be graduated, after having been suitably calibrated, either in wavelengths for a given detector, or in angular graduations. In the latter case reference tables may be used to ascertain the wavelength for each one of the various types of detectors used.

It will be seen as a result of the foregoing that the wavemeter herein described provides a measuring instrument of high accuracy usable over a wide frequency range.

Besides, the same apparatus could be used for reception of high frequency input signals by means of the plug socket 15, the low frequency output being collected through the plug socket 22—23.

It will be understood that many alterations may be made in the structural details of the wavemeter described and illustrated for purposes of indication and not of limitation, without exceeding the scope of the invention.

I claim:

1. A cavity resonator comprising a resonant cavity, a variable capacity in said cavity including a fixed and a rotatable electrode, offset means at the adjacent ends of said electrodes to vary the capacitance therebetween on rotation of the rotatable electrode, a sleeve surrounding and freely slidable on said rotatable electrode and projecting into said cavity and means for moving said sleeve axially to vary the extent of said sleeve projects into the cavity to adjust the effective resonant volume of said cavity and a detector projecting into said cavity through a side thereof and coupled with the field set up by the electrodes in said cavity.

2. A resonator according to claim 1, in which the detector comprises two elements electrically insulated from one another to form a capacity and a probe electrode projecting inwardly from one of said elements toward the aforementioned movable electrode.

3. A resonator according to claim 2, in which the probe electrode is removably secured to the element from which it projects and is one of a series of interchangeable electrodes.

4. A cavity resonator comprising a resonant cavity, a variable capacity in said cavity including axially aligned electrodes placed with adjacent ends close to one another, one of said electrodes being stationary relative to the cavity and the other being rotatable about its longitudinal axis, the adjacent ends of said electrodes being formed with eccentric portions to vary the capacitance therebetween on rotation of the rotatable electrode, a sleeve surrounding and freely slidable on one of said electrodes, means for adjustably moving said sleeve axially toward and away from the other of said electrodes, the rotary movement of said rotatable electrode and the axial movement of said sleeve being independent of one another and a probe projecting into the cavity and coupled with the field therein.

HERBERT FRANÇOIS MATARÉ.

References Cited in the file of this patent

UNITED STATES PATENTS

| Number | Name | Date |
|---|---|---|
| Re. 22,894 | Lavoie | July 1, 1947 |
| 1,620,020 | Hardy | Mar. 8, 1927 |
| 2,444,041 | Harrison | June 29, 1948 |
| 2,488,545 | Lader | Nov. 22, 1949 |
| 2,503,256 | Ginzton et al. | Apr. 11, 1950 |
| 2,556,607 | Wheeler | June 12, 1951 |

FOREIGN PATENTS

| Number | Country | Date |
|---|---|---|
| 430,645 | Great Britain | June 21, 1935 |